(12) United States Patent
Lei et al.

(10) Patent No.: US 9,218,611 B1
(45) Date of Patent: Dec. 22, 2015

(54) SYSTEM AND METHOD FOR DETERMINING BID AMOUNT FOR ADVERTISEMENT TO REACH CERTAIN NUMBER OF ONLINE USERS

(75) Inventors: Ming Lei, San Jose, CA (US); Renjie Jiang, Santa Clara, CA (US); Kenneth R. Alton, Mountain View, CA (US); Shimeng Wang, San Jose, CA (US); Abhinay Sharma, Los Altos, CA (US); Oren E. Zamir, Los Altos, CA (US); Varun R. Chirravuri, Medfield, MA (US)

(73) Assignee: Google Inc., Mountain View, CA (US)

( * ) Notice: Subject to any disclaimer, the term of this patent is extended or adjusted under 35 U.S.C. 154(b) by 457 days.

(21) Appl. No.: 13/246,547

(22) Filed: Sep. 27, 2011

(51) Int. Cl.
*G06Q 30/02* (2012.01)

(52) U.S. Cl.
CPC .................................. *G06Q 30/0244* (2013.01)

(58) Field of Classification Search
None
See application file for complete search history.

(56) References Cited

U.S. PATENT DOCUMENTS

| | | | |
|---|---|---|---|
| 6,393,479 B1 | 5/2002 | Glommen et al. | |
| 6,714,975 B1 * | 3/2004 | Aggarwal et al. | 709/224 |
| 6,839,680 B1 | 1/2005 | Liu et al. | |
| 6,925,442 B1 | 8/2005 | Shapira et al. | |
| 7,676,448 B2 | 3/2010 | Henderson et al. | |
| 7,933,984 B1 | 4/2011 | Smith et al. | |
| 7,970,946 B1 | 6/2011 | Djabarov et al. | |
| 8,156,216 B1 | 4/2012 | Error | |
| 8,838,678 B1 | 9/2014 | Weiss | |
| 2003/0163563 A1 | 8/2003 | Bean | |
| 2003/0208594 A1 | 11/2003 | Muret et al. | |
| 2004/0122735 A1 | 6/2004 | Meshkin | |
| 2004/0153365 A1 | 8/2004 | Schneider et al. | |
| 2004/0193488 A1 | 9/2004 | Khoo et al. | |
| 2004/0243704 A1 | 12/2004 | Botelho et al. | |
| 2005/0076051 A1 | 4/2005 | Carobus et al. | |
| 2005/0182707 A1 | 8/2005 | Yeager | |
| 2007/0005421 A1 | 1/2007 | Labio et al. | |
| 2007/0027768 A1 | 2/2007 | Collins et al. | |
| 2007/0157304 A1 | 7/2007 | Logan et al. | |
| 2009/0099904 A1 | 4/2009 | Affeld et al. | |
| 2009/0292803 A1 | 11/2009 | Schneider | |
| 2010/0161438 A1 * | 6/2010 | Tomak | 705/26 |
| 2010/0228850 A1 | 9/2010 | Fomitchev | |

(Continued)

OTHER PUBLICATIONS

U.S. Appl. No. 12/368,834, Jon Feldman et al.

(Continued)

*Primary Examiner* — Thomas M Hammond, III
*Assistant Examiner* — Katherine Kolosowski-Gager
(74) *Attorney, Agent, or Firm* — Foley & Lardner LLP; John D. Lanza

(57) ABSTRACT

Methods, systems, and computer programs include receiving, from an advertiser, advertisement criteria associated with an advertisement; and receiving, from a database, information regarding advertisement auctions in which the advertisement participated during a predetermined time period. A simulation is run of a first of the advertisement auctions a plurality of times, wherein the bid amount for the advertisement is changed for each simulation run An identification is made of a number of users to whom the advertisement would have been presented had the bid amount of the advertisement in the first of the advertisement auction been equal to the bid amount of the advertisement in the one of the times the simulation is run. Information related to the number of users identified for each one of the plurality of times the simulation is run is provided in a report.

9 Claims, 7 Drawing Sheets

(56) References Cited

U.S. PATENT DOCUMENTS

| | | | |
|---|---|---|---|
| 2011/0004682 A1 | 1/2011 | Honnold et al. | |
| 2011/0246641 A1 | 10/2011 | Pugh et al. | |
| 2011/0276413 A1* | 11/2011 | Lee et al. | 705/14.71 |
| 2011/0307320 A1 | 12/2011 | Tangney et al. | |
| 2012/0030152 A1 | 2/2012 | Pueyo et al. | |
| 2012/0144016 A1 | 6/2012 | Zhang et al. | |
| 2012/0166379 A1 | 6/2012 | Dasgupta et al. | |
| 2012/0310729 A1 | 12/2012 | Dalto et al. | |
| 2012/0316957 A1* | 12/2012 | Zhou et al. | 705/14.46 |
| 2013/0067070 A1 | 3/2013 | Rowe | |

OTHER PUBLICATIONS

Office Action on U.S. Appl. No. 13/246,609 dated Dec. 23, 2013.
Office Action on U.S. Appl. No. 13/246,609 dated Jun. 11, 2013.
US Notice of Allowance on U.S. Appl. No. 13/246,641 dated Mar. 25, 2015.
US Office Action on U.S. Appl. No. 13/246,641 dated Jan. 31, 2014.
US Office Action on U.S. Appl. No. 13/246,609 dated Jun. 5, 2015.
US Office Action on U.S. Appl. No. 13/246,641 dated Jun. 20, 2014.
US Office Action on U.S. Appl. No. 13/246,641 dated Sep. 23, 2014.

* cited by examiner

SYSTEM AND METHOD FOR DETERMINING BID AMOUNT FOR ADVERTISEMENT TO REACH CERTAIN NUMBER OF ONLINE USERS

BACKGROUND

The Internet provides access to a wide variety of content. For instance, images, audio, video, and web pages for many different topics are accessible through the Internet. The accessible content provides an opportunity to present advertisements to users. Advertisements can be placed within content, such as a web page, image or video, or the content can trigger the display of one or more advertisements, such as presenting an advertisement in an advertisement slot within the content and/or in an advertisement slot of a pop-up window or other overlay.

Advertisers can decide to target their ads within particular types of content (e.g., web sites of a particular genre) using various advertising management, or analytics, tools. These tools also allow an advertiser to track the performance of various advertisements (ads or ad groups) or advertising campaigns (ad campaigns). The ad criteria parameters used to determine when to display a particular ad can also be changed using advertising management tools.

The data that is used to generate the performance measures of ads for the advertiser may include a combination of data from multiple servers. In some cases, the combined data is large enough that performance measures generated from the data may be needed to provide an efficient way of understanding the data. The data, therefore, may be processed. Processing of the data to generate useful and accurate performance measures involves a number of obstacles.

SUMMARY

According to one embodiment, a method includes receiving, from a first advertiser, advertisement criteria associated with an advertisement, the advertisement criteria to be used in advertisement auctions for which the advertisement is to be considered for display to users performing online actions, the advertisement criteria including a bid amount associated with the advertisement; receiving, from a database, information regarding a plurality of advertisement auctions in which the advertisement participated during a predetermined time period. A simulation is run of a first of the plurality of advertisement auctions a plurality of times, wherein in each of the plurality of times the bid amount for the advertisement is changed. For each one of the plurality of times the simulation is run, a identification is made of a number of users to whom the advertisement would have been presented had the bid amount of the advertisement in the first of the plurality of advertisement auctions been equal to the bid amount of the advertisement in the one of the plurality of times the simulation is run. Information related to the number of users identified for each one of the plurality of times the simulation is run is provided in a report.

Various embodiments of a report generating system includes a first receiving unit configured to receive, from a first advertiser, advertisement criteria associated with an advertisement, the advertisement criteria to be used in advertisement auctions for which the advertisement is to be considered for display to users performing online actions, the advertisement criteria including a bid amount associated with the advertisement. The system also includes a second receiving unit configured to receive, from a database, information regarding a plurality of advertisement auctions in which the advertisement participated during a predetermined time period. The system further includes a simulation unit configured to run a first of the plurality of advertisement auctions a plurality of times, wherein in each of the plurality of times the bid amount for the advertisement is changed. The system still further includes an identifying unit configured to identify, for each one of the plurality of times the simulation is run by the simulation unit, a number of users to whom the advertisement would have been presented had the bid amount of the advertisement in the first of the plurality of advertisement auctions been equal to the bid amount of the advertisement in the one of the plurality of times the simulation is run. The system also includes a providing unit configured to provide, in a report, information related to the number of users identified for each one of the plurality of times the simulation is run.

According to another embodiment, a non-transitory computer readable medium storing computer program product is described, which, when executed by at least one computer, causes the at least one computer to perform the functions of:

receiving, from a first advertiser, advertisement criteria associated with an advertisement, the advertisement criteria to be used in advertisement auctions for which the advertisement is to be considered for display to users performing online actions, the advertisement criteria including a bid amount associated with the advertisement;

receiving, from a database, information regarding a plurality of advertisement auctions in which the advertisement participated during a predetermined time period;

running a simulation of a first of the plurality of advertisement auctions a plurality of times, wherein in each of the plurality of times the bid amount for the advertisement is changed;

for each one of the plurality of times the simulation is run, identifying a number of users to whom the advertisement would have been presented had the bid amount of the advertisement in the first of the plurality of advertisement auctions been equal to the bid amount of the advertisement in the one of the plurality of times the simulation is run;

and providing, in a report, information related to the number of users identified for each one of the plurality of times the simulation is run.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
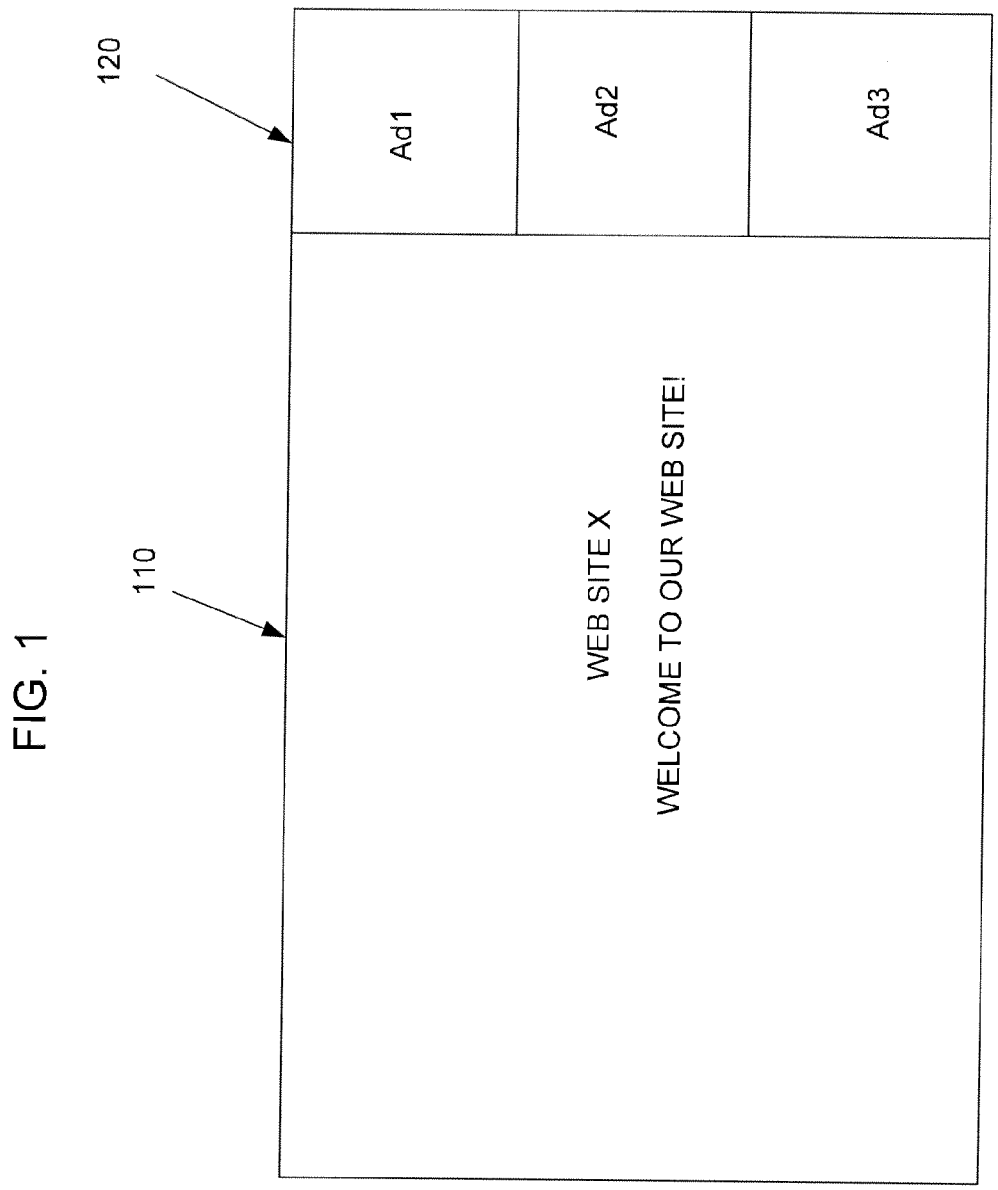
FIG. 1 is a diagram showing advertisements provided on a portion of a web page for display to a user, in accordance with an illustrative embodiment.

In one embodiment, an advertiser selects a bid for an advertisement in an Ad Group or an Ad Campaign that the advertiser wants displayed on the Internet using an ad auction application, such as Google AdWords. In some embodiments, the system provides the advertiser with information to allow the advertiser to determine the necessary bid to reach a targeted number of unique users.

A unique identifier can be stored as a cookie. Cookies can be deleted from user devices, such as by a user deleting cookies, a browser deleting cookies (e.g., upon browser exit, based on a browser preference setting), or some other software (e.g., anti-spyware software) deleting cookies.

If cookies are deleted from a user device, a new cookie will be set on the user's device when the user visits a web page. The new cookie may be used to store a new quasi-unique identifier, and thus subsequent user interaction data that occurs on the user device may be associated with a different identifier. Therefore, because each user identifier is considered to represent a different user, the user interaction data associated with the deleted cookies are identified as being associated with a different user than the user interaction data that is associated with the new cookies.

Described herein are illustrative embodiments for providing an advertiser with pertinent information, in the form of a user landscapes report, for providing the advertiser with information about a relationship between traffic, cost (or budget) and bid for content ads of an ad group and/or an ad campaign (or for an entire ad group or ad campaign). Some of these embodiments can be used with the Google Display Network (GDN), or with other types of online auction applications in which ads participating in an online auction are input to a ad server to determine which of those ads will win the auctions. The output of the ad server (e.g., which ads won the auction and which ads lost the auction) is fed to a log file as an offline (e.g., batch) process, referred to as a landscapes pipeline. Based on auction simulations performed by a server that determine a minimum bid for each ad to win each auction of each unique online user, a lowest bid for each ad to win each auction of each unique online user is determined, and a plurality of (bid, user) pairs for each ad are obtained. For each (bid, user) pair, the bid represents a bid necessary to win an auction for the user based on the criteria considered in the auction. The plurality of (bid, user) pairs are aggregated to construct a curve, or plot, which represents the relationship between the number of reached users and the bid for an ad (see, e.g., FIG. 6). In an illustrative embodiment, an offline landscapes pipeline process is performed daily, and data from a plurality of (e.g., seven) consecutive days of landscapes data is aggregated, to obtain an N-day window (N being an integer) used to compute the number of unique users at each potential bid point for an ad, an ad group or an ad campaign.

An ad group contains one or more ads which target a set of keywords, ad placements on a web page, or both. The advertiser sets a bid, or price, to be used when an ad is triggered by the keywords or placements in the ad group. An ad campaign may be a set of one or more ad groups of an advertiser, with each ad group serving a different purpose. For example, a first ad group in an ad campaign may correspond to ads that introduce a particular product to users, a second ad group in the ad campaign may correspond to ads that provide more details on the particular product (e.g., to be output at a later point in time after the first ad group has been shown to users), and a third ad group in the ad campaign may correspond to other, related products of the same advertiser. According to various embodiments, the system may be configured to provide an advertiser with information about bid and cost relationships for an advertisement, an ad group, or an ad campaign of the advertiser. By providing the advertiser with detailed statistics on the number of users an advertisement or group of advertisements has reached (i.e., were 'impressed' to users), as a function of bid, an advertiser can optimally set a bid for future ads, ad groups and ad campaigns, so as to maximize the ratio of advertising revenue to advertising cost.

One definition of "landscape" in some embodiments is a relationship between traffic, cost and bid, with respect to an ad, ad group, or ad campaign. 'Traffic' is the amount of users the ad was shown to (impressed to), 'cost' is the amount of money that the advertiser had to pay for showing the ad to the users, and 'bid' is the cost-per-click amount that the advertiser selected for an ad, for consideration in ad auctions that are performed due to certain online user actions. For example, one type of user action that may cause an ad auction to occur is when users enter predetermined web pages that allow ads to be provided on their pages. These predetermined web pages are referred to as publishers. Publishers may receive revenue when ads displayed on their pages are clicked by users. The publishers may be provided additional revenue when those ads are converted to an actual purchase of an advertiser's product or when a user registers on the advertiser's web site that the user is sent when he/she clicked on the ad, etc. The types of ads to be considered for auctions due to these type of user actions may be referred to as "content ads." Other definitions of "landscape" are possible with respect to some embodiments, while remaining within the spirit and scope of the invention (such as a landscapes that relates different ad budgets to traffic and/or cost and/or clicks).

A second type of user action that may cause an ad auction to occur is when users perform online searches using an online search application, such as the online search engine provided by Google. For this second type of user action, the keywords associated with the user's online search are compared to keywords and phrases associated with ads of an advertiser, and if there is a sufficient match, and based on other parameters such as predicted click thru rate (pCTR) of the ad and the bid entered for that ad by the advertiser (using Google AdWords application, for example), the ad may either win the auction or lose the auction to other competing ads. If the ad wins the auction, that ad is displayed to the user along with the user's online search results, typically at a particular position (e.g., to the right of, and/or above) of the online search results screen. For either of the first and second types of user actions that cause ad auctions to be performed, a combination of bid and quality is used by a ad server to determine which ads in a database of candidate ads "win" each auction and are thus shown to the user, whereby all ads that "lose" each auction are returned by the ad server back to the ad indexes that store the ads for consideration in current and future ad auctions.

FIG. 1 shows an illustrative example of a web site which includes an advertisement section 120, whereby advertisements that win an advertisement auction caused by a user entering the web site are displayed in the advertisement section 120. In the example shown in FIG. 1, there is room for three ads to be shown, Ad1, Ad2 and Ad3, whereby the web site entered by the user also includes a non-ad section 110 that corresponds to information of the web site owner, in this case, a "Welcome Greeting" to users entering Web Site X.

Figure 2:
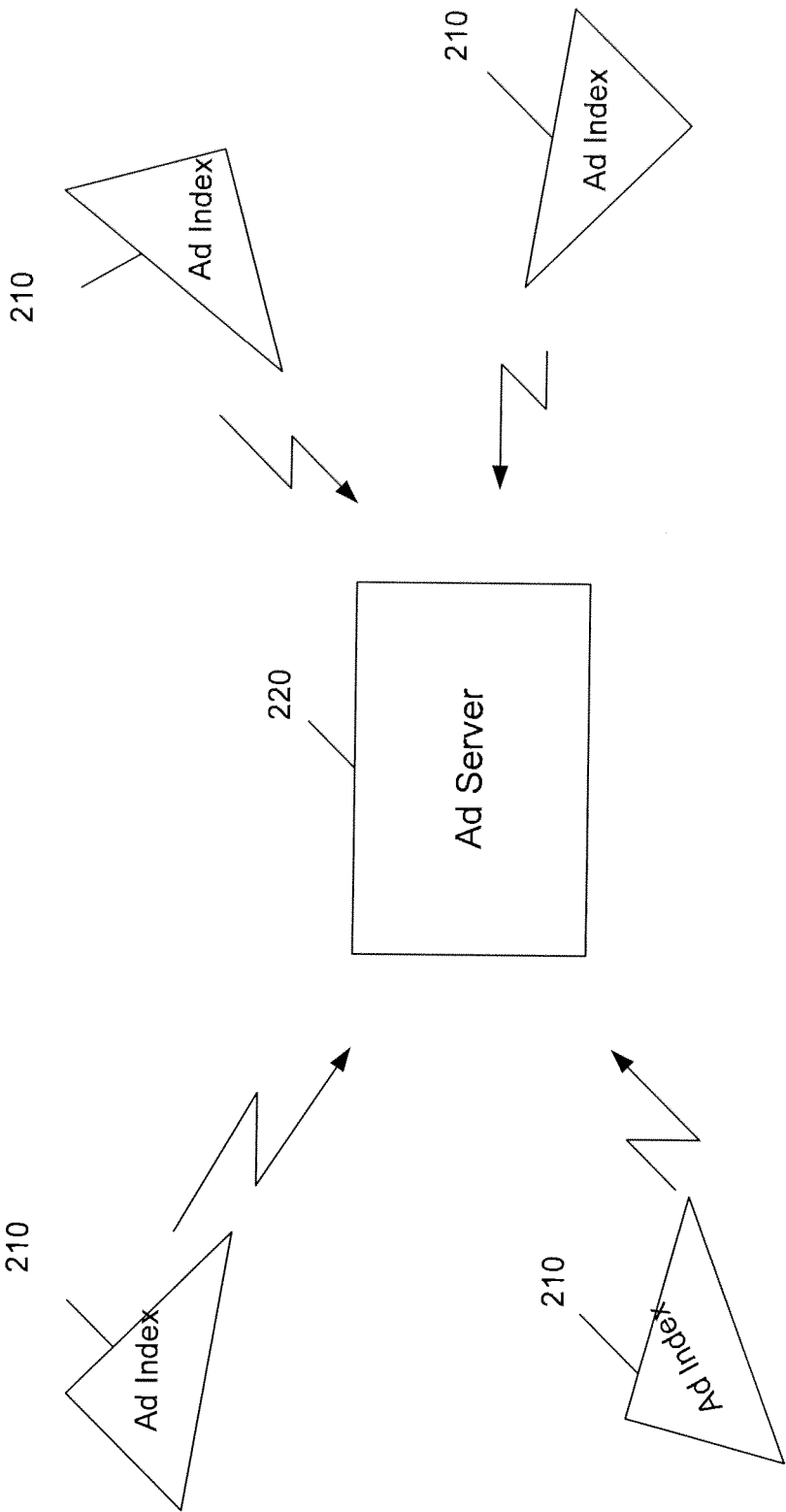
FIG. 2 is a diagram showing connectivity between ad indexes that store advertisements, and an ad server that determines which advertisements will win an auction, consistent with embodiments of the invention.

FIG. 2 shows a plurality of ad indexes 210 that store advertisements for consideration in ad auctions, in which a ad server 220 determines which of the advertisements stored in the ad indexes 210 will win an auction and thus be shown (or "impressed") to a user that caused an auction to be performed.

Given the relationship between traffic, cost and bid, landscapes provide information for an advertiser to determine the appropriate cost and bid levels to assign for an ad, ad group and/or ad campaign. A first landscape that can be determined in some embodiments is a Bid landscape, which is a cost function of bid. A second landscape that can be determined in some embodiments is a Cost landscape, which is a traffic function of cost. Other landscapes can also be determined and provided to an advertiser in a User Landscapes Report, to be described in more detail below.

A landscape can be understood as a function in the form of $Y=f(X)$, which is a single variable function (X being the variable) in which every variable other than X stays constant. For example, a Bid-Impression landscape for an Ad Group in the form of Imp(Bid) assumes that the bid of an Ad Group changes and every other variable, such as the bids made by other advertisers for other Ad Groups competing with the Ad Group in online auctions, stays the same. As a prediction tool, landscapes can be a fairly accurate barometer of information to provide to advertisers, based on the assumption of a single changing variable with all other variables non-changing. For a Landscapes $Y(X)$, Y may correspond to an accumulated value over a certain time period, such as one day, or one week, or one month. For example, Y may correspond to the number of impressions made by an ad for a particular bid amount X for that ad over a week's time period. The user landscapes report may be generated at the same time other reports are generated for a user, such as a user share report that provides the user with information as to the different set of users that an advertisement can reach.

Explanation will now be provided for how a Bid-Impression landscape is computed consistent with illustrative embodiments. A Bid-Impression Landscape for an ad or Ad Group (e.g., Ad Group/Criteria, in which an ad group criteria is something that an advertiser can assign to a particular Ad Group, whereby the advertiser can assign more than one criteria to the same Ad Group in Google Ad Words), is also referred to herein as a "Bid Impression Landscapes", or BILA. BILA is a function of Impressions(Bid) for an Ad Group/Criteria, and corresponds to the finest level of granularity an advertisers can place a bid upon. Impressions(Bid) means that for a particular bid placed by an advertiser for an ad, ad group, or ad campaign, the number of impressions made to users within a particular time period (e.g., the last seven days) is determined.

The actual impressions made by that ad to users within the particular time period is of course known, since that corresponds to the number of auctions within the particular time period that the ad, ad group or ad campaign won and was thus shown to a user. However, for the auctions that the ad lost, an auction simulation is performed in some embodiments, to determine the number of additional auctions the ad would have won during the predetermined time period if the bid was increased. For example, if an ad won 55 ads during a seven day period, but lost out on 188 other auctions during that same seven day period, the auction simulation determines, for increasing bid amounts (e.g., increasing in units of 1 cent in bid amount), how many of those 188 lost auctions the ad would have won with the increased bid amount. As described above, the bid amounts for all of the competing ads in those 188 auctions are kept constant, and only the variable associated with the bid amount of ad in question is changed (e.g., increased) to determine how many more auctions that ad would have won for different bid amounts. As a result, a plot of 'bid amount versus won auctions' is obtained for an ad, which in effect corresponds to a Bid-Impression landscape for that ad.

In more detail, for each simulated auction performed, the minimum bid required by an ad to win the auction is determined, and that amount is stored in a memory for that auction. A set of pairs of (bid, impressions) is thereby obtained, in which impressions correspond to an ad being shown to an online user due to the ad winning an auction caused by that online user. The set of pairs of (bid, impressions) can also be understood to correspond to the derivative function of Impressions(Bid), from a mathematical perspective.

Once the set of pairs of (bid, impressions) is obtained for an ad, for example, an aggregating unit or process aggregates those sets of pairs, in the same manner as a mathematical integral function, to construct the BILA. The final result is a series of (Bid, Total Impressions). That is, for each bid assigned to an ad, the total number of impressions is determined, and provided to an advertiser in a User Landscapes Report as a Bid-Impression Landscapes (BILA).

Continuing with the same example as provided above, assume that an auction simulation unit or process determined the following information for the ad, for the previous seven day period: Bid=$0.05, Total Impressions=55 (this is the actual bid made by the advertiser for the ad); Bid=$0.06, Total Impressions=67 (computed based on results provided by the simulation unit); Bid=$0.07, Total Impressions=100 (computed based on results provided by the simulation unit); Bid=$0.08, Total Impressions=103 (computed based on results provided by the simulation unit); Bid=$0.09, Total Impressions=110, etc.

From the above BILA, it would be apparent to an advertiser that he/she should increase the bid (the price to be paid for each click made on that ad in the publisher's web site) assigned to that ad from $0.05 to $0.07, since any higher bids assigned to that ad do not yield a much greater amount of users to be shown the ad (and thus the added cost per click to be paid will likely not be overcome by the added number of users shown the ad).

BILA is an increasing function as provided by the parameters set in the auction simulation unit or process (in that only one variable changes for each auction, that being the bid assigned to an ad, ad group, or ad campaign). This results in a concave plot of 'bid versus impressions' values in a User Landscapes Report.

User Landscapes can be constructed for a short period of time, such as a single day, or for longer periods of time. Due to scalability reasons, tracking of users over multiple days is not desired since it takes a good deal of processing time and resources, and so a multi-day aggregation of User Landscapes is performed in some embodiments, as an average over all single-day User Landscapes during the multi-day period. Provided below is software pseudo-code for performing an aggregation process of single-day User Landscapes over a multi-day period, consistent with some embodiments:

```
Given 7 single-day Landscapes L_i={"(bid, usershare), . . . }, i is from 1 to 7
For each bid b that appears in any Landscapes_i
    For each L_i
        If L_i does not contain b
            dd (b, usershare) into Landscapes_i
``` using linear extrapolation from the closest points in L_i;

take the ave_usershare as average of usershare at bid=b across all Landscapes;

add (b, ave_usershare) into the aggregated Landscapes aggBL;

aggBL now contains all bids from every input Landscapes L_i

Run point-selection on aggBL to limit the number of bid points before output.

The aggregating of 7 single-day Landscapes can be done by at least two different ways:

1) associate user number with each bid point, in which the bid points are selected by spacing based on (click, cost) or impressions, or 2) bid points selected by spacing based on user number.

These two ways of aggregating data are explained in more detail below.

The 7 day aggregation of landscapes serves at least two purposes. The first purpose of aggregation (the $1^{st}$ stage of aggregation) is that it smoothes the fluctuation of traffic and network environment. For example, it is a common pattern that traffic rises on weekdays and drops on weekends. Given a sliding 7-day window, the landscapes prediction is more stable than by just using data from a single day. So, in a 1st stage of aggregation, data from 7 daily landscapes curves is rolled up, or accumulated, as explained above. The second purpose of aggregation (a $2^{nd}$ stage of aggregation) is utilized to pick up a few points of the landscapes curve which can best represent the landscapes curve (the 7-day curve), to thereby not overload the advertiser with too much data when viewing the landscapes data report.

Usually, for any particular <ad_group_id, criteria_id>, it may receive hundreds or thousands of bid points. For those high-volume ads, it may have millions of bid points on it's curve. As such, it is not practical to shown that many points to an advertiser in a landscapes report. Instead, the $2^{nd}$ stage of aggregation is utilized to select a few typical points on the curve, by using different point selection algorithms as described below.

Each different point selection algorithm defines its own "distance function" d(x, y), in which x and y are two separate points on the 7-day landscapes curve. Each point is a tuple of <bid, impressions, clicks, cost, conversions, unique_users> (whereby unique_users is associated with a bid point as discussed above). The point selection algorithms utilized in a 7-day landscapes data aggregation operate to optimize (e.g., minimize) a function D, given L (landscapes curve) and N (number of points needed), as shown in the equation below:

$$D=\text{sum}\{d(x[i-1],x[i])^2\}, \text{ whereas } \{x[i]|x[i] \text{ on } L\} \text{ and } i \text{ in } \{0, \ldots N-1\}$$

Typically, the expected number of points needed N is less than 10.

Given the use of different point selection algorithms, different sets of bid points from the landscapes curve can be chosen and thereby provided to an advertiser in a user landscapes report.

For point selection based on click-cost, d(x,y) is defined as: $d(x, y)=[(\text{click\_y}-\text{click\_x})^2+(\text{cost\_y}-\text{cost\_x})^2]^{0.5}$, in which click_x and cost_x correspond to predicted clicks and cost on bid point x (or bid amount=x), and in which click_y and cost_y correspond to predicted clicks and cost on bid point y (or bid amount=y). This is one possible point selection algorithm that may be utilized in various embodiments, in which this point selection algorithm provides for evenly spaced selected points of (click, cost).

Because bid points are associated with the tuple <impressions, clicks, cost, conversions, unique_users>, once the selection points have been determined, a unique users number corresponding to those selection points can be obtained, as discussed above with respect to a first way of aggregating daily landscapes data to obtain multi-day data. Particularly, points on the landscapes curve may be picked up by spacing them with respect to unique_users, in accordance with the equation below:

$$d(x,y)=|\text{unique\_users\_}y-\text{unique\_users\_}x|$$

As such, between every two consecutive points on the curve, the increment of unique_users becomes relatively constant. This is another possible point selection algorithm that may be utilized in various embodiments.

The above description of how user landscapes is computed does not necessarily differentiate between users and unique users. That is, if one user causes 25 auctions to be performed during one day, that one user would be treated as 25 separate users, when in fact those 25 auctions were due to one unique user. However, to obtain more definitive statistics to an advertiser, the ability to differentiate between "users" and "unique users" is helpful in deciding the relative impact of an advertisement and whether its bid should be increased to potentially show it to more "unique users."

As described above, one aspect of providing the advertiser with pertinent information in the User Landscapes Report according to some embodiments is that unique users are discerned, and counted with respect to ad auctions. Cookie correction is performed for online accesses that generate auctions, whereby cookie correction filters non-unique users from unique users accessing the Internet. As explained earlier, there are many different reasons why it is difficult to count unique users, such as users performing cookie reset during an online (e.g., Internet) session, users deleting cookies, cookies expiring, users disabling their cookies, and the Internet browser used by users hiding cookies and/or providing its own "default" cookie in its place.

To account for these cookie issues, the cookie correction algorithm only selects "good" cookies, which are cookies that have persisted for a period of time on the Internet (e.g., 12 hours or more). As such, a first user cookie is not counted, but rather only if the cookie is reused for at least a certain number of Internet accesses (e.g., three or more) is the cookie determined to be "seasoned" and thus counted. The following software pseudo code can be performed in cookie correction in an illustrative embodiment:

For an Adgroup ad1

Goodusers_ad1={shown_impression_ad1, lost_impression_ad1, ... }

$$\text{Ad1\_uniqueusers} = \frac{\text{AuctionParticipation\_ad1}}{\text{AuctionParticipation\_ad1, goodusers}} * \text{Gooduser\_ad1}$$

The term Auction Participation corresponds to all auctions for which advertisements of Adgroup Ad1 participated in. Goodusers_ad1 is a vector of values (including shown impressions, bid lost, budget lost, frequency capped, etc.) for adgroup Ad1 computed using only page views from users having "seasoned" (also referred to herein as "good") cookies. AuctionParticipation_ad1, goodusers corresponds to the number of auctions participated by an advertisement of Adgroup Ad1 on the page views of "good" users (those users having "good" cookies). In the cookie correction algorithm, a unique cookie id is set to an online request (e.g., a request by a user to go to a particular Internet web page that will host advertisements, or a request by a user to conduct a particular image search or keyword search on the Internet) if the request comes in without a cookie, and those cookies are treated as "not good" cookies.

Figure 3:
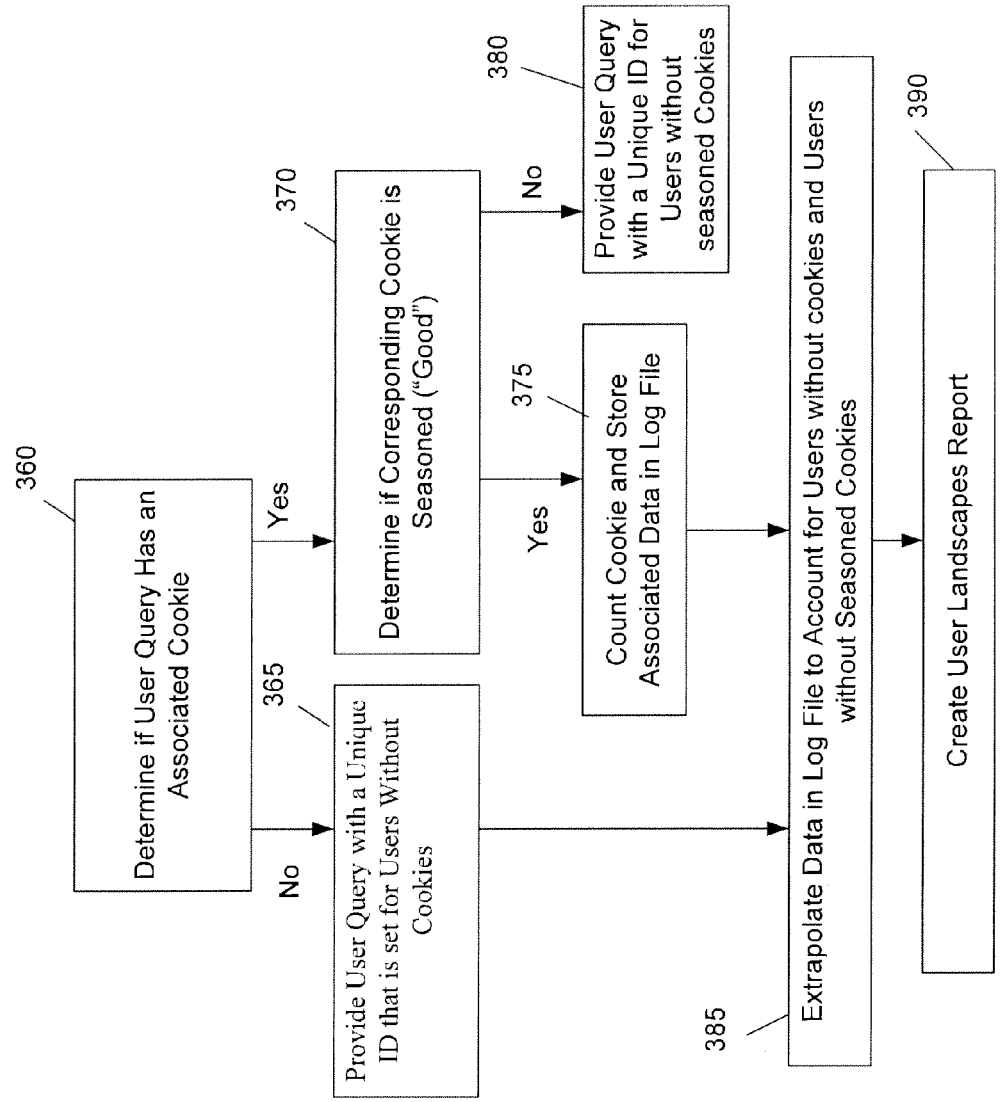
FIG. 3 is a flow diagram showing the steps for performing cookie correction, consistent with various embodiments of the invention.

FIG. 3 is a flow chart showing the steps of cookie correction utilized in the formation of a user landscapes report, according to several embodiments of the invention. In step 360, it is determined whether a user query has an associated cookie. If the request does not have an associated cookie, then in step 365 that user query is provided with a unique cookie ID that is set for users without cookies. In step 370, it is determined if the corresponding cookie is "seasoned" (e.g., is "good"). If the cookie is seasoned, then it is counted in step 375. If the cookie is not seasoned, then in step 380 that user query is provided with a unique cookie ID that is set for users without seasoned cookies. In step 385, all of the user requests made within a predetermined time period (e.g., the last 24 hours) are extrapolated upwards to account for users without cookies. In step 390, a user landscapes report is created based on the extrapolated user landscapes data obtained in step 385.

By way of example, consider a case where there are 200 cookies counted, of which only 150 are good cookies. As such, statistics are obtained of the number of unique users in the auctions in which an ad participated in based on the 150 good cookies, and then those statistics are scaled up by a ratio of 200/150 to account for the not good cookies. That way, the User Landscapes Report gives a reasonable estimation of the number of unique users who would have been shown an ad based on a particular bid assigned by the advertiser to that ad.

Since the cookie correction algorithm may be performed at the aggregate level, to obtain statistics that are provided in the User Landscapes Report, the individual identity of each of the unique users is preserved and not provided to an advertiser in the User Landscapes Report.

Figure 4:
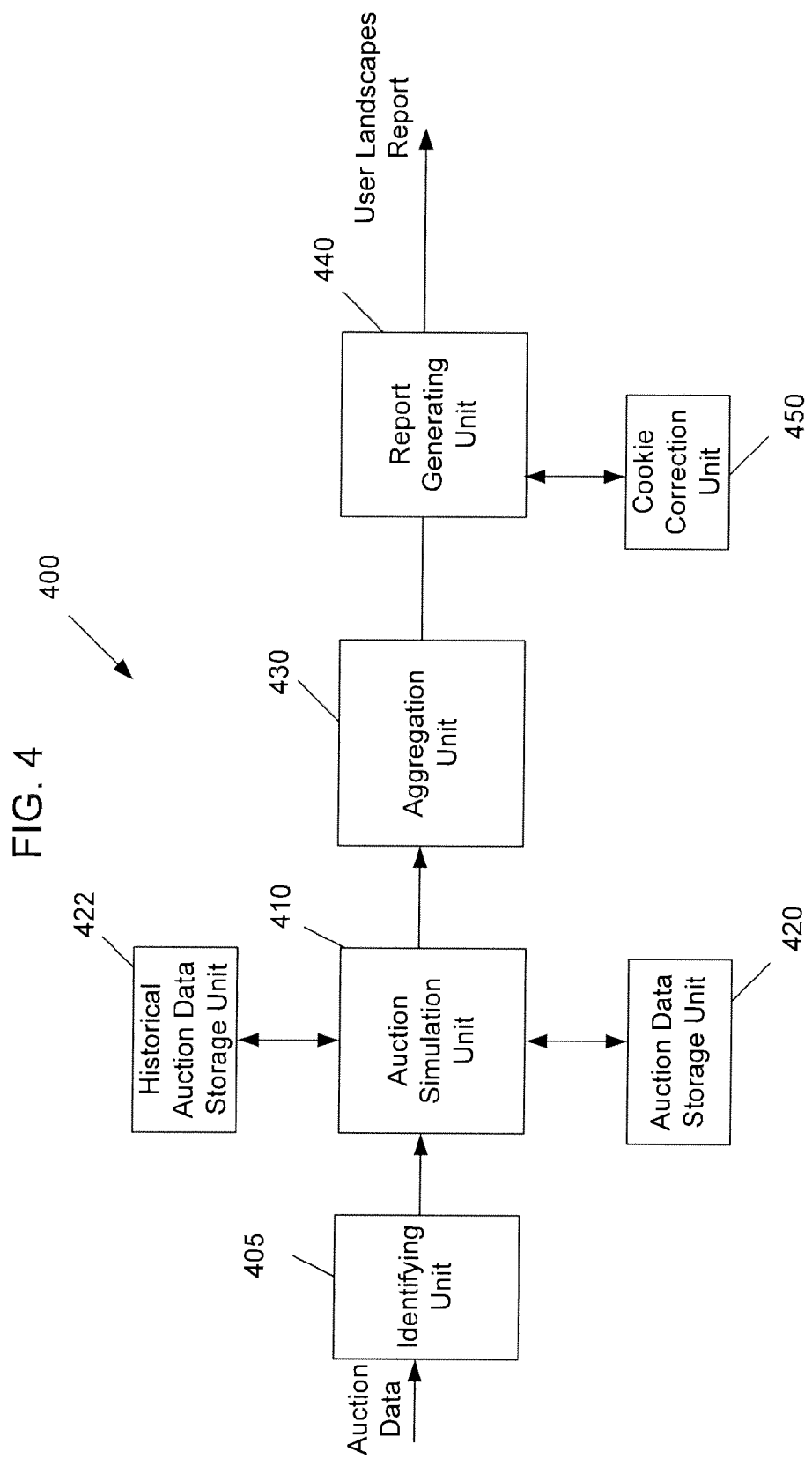
FIG. 4 is a block diagram showing elements of a user landscapes system, consistent with various embodiments of the invention.

FIG. 4 shows a User Landscapes computation system 400 consistent with various embodiments of the invention. Auction data is received by an identifying unit 405, which receives auction data and which identifies auctions that occurred during a predetermined time period in which an ad participated in, and in which of those auctions the ad did not win. In some embodiments, the auction data can be provided to the identifying unit 405 by an application such as Google AdWords, and/or from an Internet server or servers storing such information. The output of the identifying unit 405 is provided to an auction simulation unit 410, which performs simulated auctions by changing one variable in an auction (e.g., the bid assigned to an ad) to determine the bid amount for the ad that would have resulted in the ad winning the auction that the ad participated in, and stores the results in an auction data storage unit 420. The auction simulation unit 410 also may refer to historical auction data stored in a historical auction data unit 422, which may include information as to predicted ad clicks based on ad position on a web page, in performing its auction simulations. An aggregation unit 430 aggregates the simulated auction data output by the auction simulation unit 410, to provide a multi-day auction data, which is provided to a report generating unit 440 that outputs a user landscapes report. The report generation unit 440 may utilize a cookie correction unit 450 to modify the user landscapes report to show data for unique users (whereby the report does not identify the unique users, and so their privacy is maintained).

Figure 5:
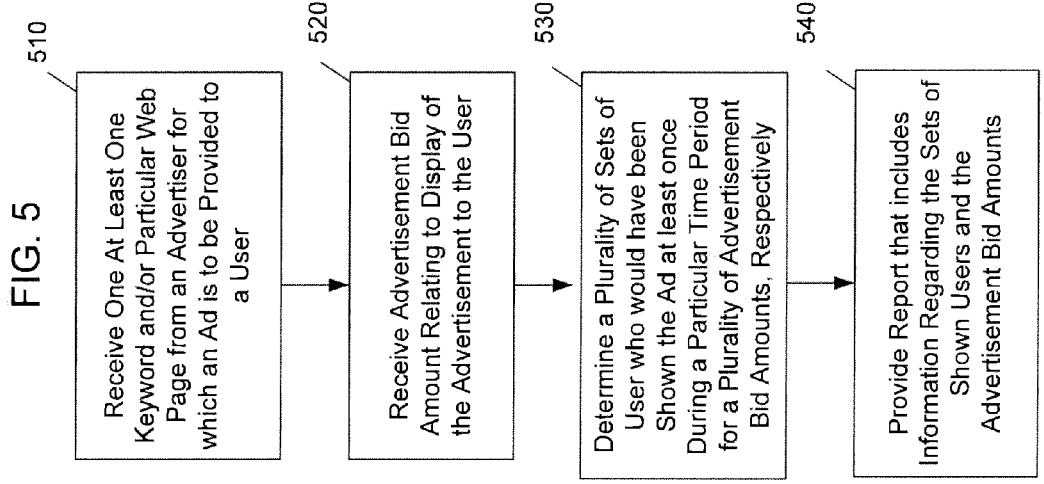
FIG. 5 is a flow chart showing stages in the computing of a user landscapes report consistent with some embodiments of the invention.

FIG. 5 is a flow chart showing stages in the computing of a user landscape report consistent with some embodiments of the invention. In a first stage 510, advertisement criteria associated with an advertisement is received from an advertiser, in which the advertisement criteria is to be used in advertisement auctions for which the advertisement is to be considered for display to users performing online actions, the advertisement criteria including a bid amount associated with the advertisement. In a second stage 520, information regarding a plurality of advertisement auctions in which the advertisement participated during a predetermined time period is received from a database in which that information is stored. In a third stage 530, a simulation is run of a first of the plurality of advertisement auctions a plurality of times, wherein in each of the plurality of times the bid amount for the advertisement is changed. In a fourth stage 540, for each one of the plurality of times the simulation is run, an identification is made of a number of users to whom the advertisement would have been presented had the bid amount of the advertisement in the first of the plurality of advertisement auctions been equal to the bid amount of the advertisement in the one of the plurality of times the simulation is run. In a fifth stage 550, information related to the number of users identified for each one of the plurality of times the simulation is run is provided in a report.

Figure 6:
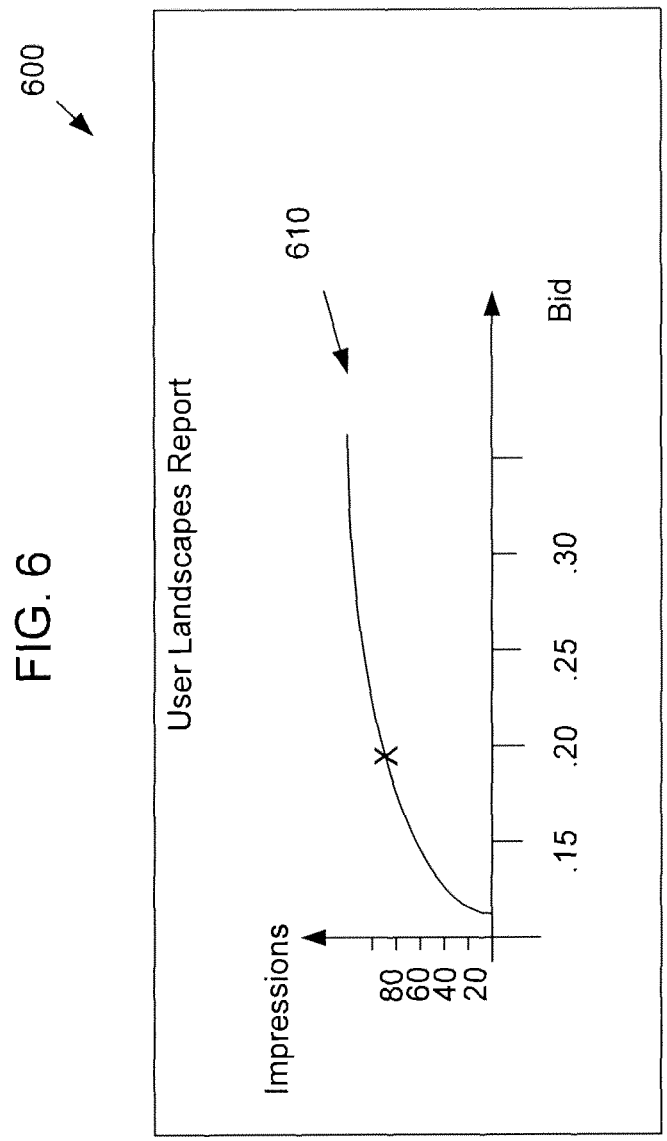
FIG. 6 is a diagram showing one possible implementation of a User Landscapes Report, consistent with various embodiments of the invention.

FIG. 6 shows a structure of a User Landscapes Report 600 consistent with various embodiments of the invention. The report may be generated by the system in the form of display data that is transmitted to one or more client computers. The User Landscapes Report 600 includes a plot 610 of impressions per bid. The "X" in the plot 610 represents the actual number of impressions of an ad and the actual bid made by an advertiser for the ad, and the other plot points represent different {impressions, bid} values that are determined based on the computations performed by an auction simulation unit and other elements of a user landscapes computation system, such as the one shown in FIG. 4. From this information, an advertiser can determine whether it makes sense for him/her to increase a bid or cost for an ad group and/or ad campaign to try to find the optimal online advertisement costs versus online advertisement revenue point. As shown in FIG. 6, the user landscapes report can perform simulated auctions using lesser bids than what an advertiser actually submitted for an ad, to determine if the advertiser has been overbidding on his/her ads.

A user landscapes report database schema that can be utilized in to various embodiments is provided below.

ContentAdGroupCriteriaBidSimulatorStats
    AccountId: INT
    CampaignId: INT
    AdGroupId: BIGINT
    CriteriaId: BIGINT
    EndDate: Date
    StartDate: Date
    AdNetworkTypeId: INT
    BidDimesion: ENUM, CPC/CPM/VBB_CPA
    LandscapesTypeId: INT, how to bucket landscapes curve (AbsoluteMaxCpc, AbsoluteImpression, Absolute Click . . . )
    Bid: BIGINT, the target bid given by BL, in advertiser's local micros
    BidMultiplier: BIGINT, by what scale advertiser has to scale his bid to achieve estimation
    LocalImpressions: BIGINT, estimated impression number on given bid
    LocalPositionSum: BIGINT, estimated sum of position on given bid, to calculate average position
    LocalClick: FLOAT, estimated click number on given bid
    LocalConversion: FLOAT, estimated conversion number on given bid
    LocalCost: BIGINT, estimated cost on given bid LocalMarginalCpc: BIGINT, estimated marginal unit cost (impression, click, conversion) on given bid LocalUniqueUsers: BIGINT, estimated daily unique user number reached on given bid.

The apparatus and method according to various embodiments can be realized by instructions that upon execution cause one or more processing devices to carry out the processes and functions described above. Such instructions can comprise, for example, interpreted instructions, such as script instructions, e.g., JavaScript® or ECMAScript® instructions, or executable code, or other instructions stored in a computer readable medium. The apparatus and method according to the various embodiments can be distributively implemented over a network, such as a server farm, or can be implemented in a single computer device.

Figure 7:
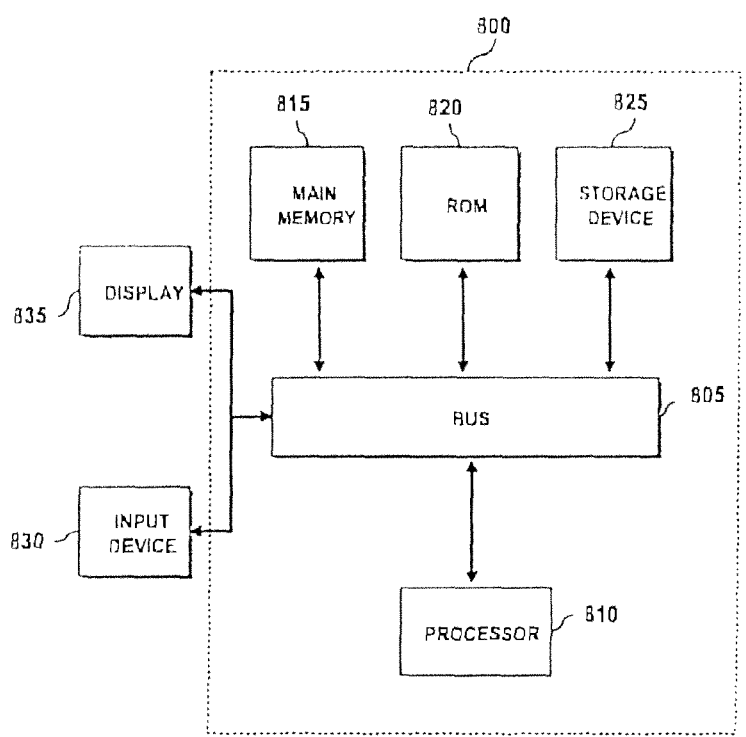
FIG. 7 is a block diagram of a computer system in accordance with an illustrative embodiment.

FIG. 7 illustrates a depiction of a computer system 800 that can be used to create and output a user landscapes report, consistent with embodiments of the invention. The computing system 800 includes a bus 805 or other communication mechanism for communicating information and a processor 810 coupled to the bus 805 for processing information. The computing system 800 also includes main memory 815, such as a random access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 810 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another embodiment, the input device 830 has a touch screen display 835. The input device 830 can include a cursor control, such as a mouse, a trackball, or cursor direction keys, for communicating direction information and command selections to the processor 810 and for controlling cursor movement on the display 835.

According to various embodiments, the processes that effectuate illustrative embodiments that are described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative embodiments, hard-wired circuitry may be used in place of or in combination with software instructions to implement illustrative embodiments. Thus, embodiments are not limited to any specific combination of hardware circuitry and software.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the information related to the number of users provided in a user landscapes report can be the percentage of users in a particular market segment, such as the percentage of women or men, or the percentage or persons living in a particular state or country (which can be obtained from information provided by a user's web browser). In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
receiving, at a computing system, from an advertiser, a bid amount associated with an advertisement, the bid amount to be used in a plurality of advertisement auctions to deliver the advertisement to users performing online action for a predetermined bid validity period determined by the advertiser, wherein the computing system comprises at least one computer processor and memory;

automatically identifying, with the computing system, the winning bid amounts for each of the plurality of advertisement auctions conducted during a predetermined analysis period, wherein the winning bid amounts comprise the bid amount from the advertiser and other bid amounts from a plurality of other advertisers;

generating, with the computing system, a bid impression landscape for the advertiser during the predetermined analysis period, wherein generating the bid impression landscape comprises:

determining the number of advertisement auctions won by the advertiser from unique users during the predetermined period based on the identification and a cookie correction algorithm which filters a number of unique users from the number of advertisement auctions won by the advertiser accessing the Internet;

within the range of the winning bid amounts identified, creating a set of simulated bid amounts for the advertiser in equal increments and decrements within the range;

for each simulated bid amount in the set of simulated bid amounts, calculating the number of auctions the advertiser would have won from unique users based on the cookie correction algorithm; and plotting the calculated number of auctions won by the advertiser and the determined number of auctions won by the advertiser with their associated simulated bid amounts and bid amount; and providing, by the computing system, a report to the advertiser, wherein the report comprises the bid impression landscape.

2. The method according to claim 1, wherein providing the report to the advertiser comprises providing a percentage of users in a particular market segment.

3. The method according to claim 1, wherein the bid amount is changed to a value less than an actual advertisement bid amount made by the advertiser in response to the report.

4. A non-transitory computer readable medium storing a computer program product, which, when executed by at least one computer, causes the at least one computer to perform the steps of:

receiving, at a computing system, from an advertiser, a bid amount associated with an advertisement, the bid amount to be used in a plurality of advertisement auctions to deliver the advertisement to users performing online action for a predetermined bid validity period determined by the advertiser, wherein the computing system comprises at least one computer processor and memory;

automatically identifying, with the computing system, the winning bid amounts for each of the plurality of advertisement auctions conducted during a predetermined analysis period, wherein the winning bid amounts comprise the bid amount from the advertiser and other bid amounts from a plurality of other advertisers;

generating, with the computing system, a bid impression landscape for the advertiser during the predetermined analysis period, wherein generating the bid impression landscape comprises:

determining the number of advertisement auctions won by the advertiser from unique users during the predetermined period based on the identification and a cookie correction algorithm which filters a number of unique users from the number of advertisement auctions won by the advertiser accessing the internet;

within the range of the winning bid amounts identified, creating a set of simulated bid amounts for the advertiser in equal increments and decrements within the range;

for each simulated bid amount in the set of simulated bid amounts, calculating the number of auctions the advertiser would have won from unique users based on the cookie correction algorithm; and plotting the calculated number of auctions won by the advertiser and the determined number of auctions won by the advertiser with their associated simulated bid amounts and bid amount; and providing, by the computing system, a report to the advertiser, wherein the report comprises the bid impression landscape.

5. The non-transitory computer readable medium according to claim 4, wherein the report comprises a percentage of users in a particular market segment.

6. The non-transitory computer readable medium according to claim 4, wherein the bid amount is changed to a value less than an actual advertisement bid amount made by the advertiser in response to the report.

7. A system comprising:
a processing circuit programmed to:
receive, from an advertiser, a bid amount associated with an advertisement, the bid amount to be used in a plurality of advertisement auctions to deliver the advertisement to users performing online action for a predetermined bid validity period determined by the advertiser, wherein the computing system comprises at least one computer processor and memory;

automatically identify, with the computing system, the winning bid amounts for each of the plurality of advertisement auctions conducted during a predetermined analysis period, wherein the winning bid amounts comprise the bid amount from the advertiser and other bid amounts from a plurality of other advertisers;

generate, with the computing system, a bid impression landscape for the advertiser during the predetermined analysis period by:

determining the number of advertisement auctions won by the advertiser from unique users during the predetermined period based on the identification and a cookie correction algorithm which filters a number of unique users from the number of advertisement auctions won by the advertiser accessing the internet;

within the range of the winning bid amounts identified, creating a set of simulated bid amounts for the advertiser in equal increments and decrements within the range;

for each simulated bid amount in the set of simulated bid amounts, calculating the number of auctions the advertiser would have won from unique users based on the cookie correction algorithm; and plotting the calculated number of auctions won by the advertiser and the determined number of auctions won by the advertiser with their associated simulated bid amounts and bid amount; and provide, by the computing system, a report to the advertiser, wherein the report comprises the bid impression landscape.

8. The system of claim 7, wherein the report comprises a percentage of users in a particular market segment.

9. The system according to claim 7, wherein the bid amount is changed to a value less than an actual advertisement bid amount made by the advertiser in response to the report.

* * * * *